Mar. 20, 1923.

F. G. L. BOYER 1,449,162

SCALE AND AUXILIARY CONTROLLER

Filed Aug. 5, 1920

WITNESSES
Felix Thomas

INVENTOR.
F. G. L. Boyer
BY Kerr Page Cooper & Hayward
his ATTORNEYS

Mar. 20, 1923.

F. G. L. BOYER 1,449,162

SCALE AND AUXILIARY CONTROLLER

Filed Aug. 5, 1920

Mar. 20, 1923.
F. G. L. BOYER
1,449,162
SCALE AND AUXILIARY CONTROLLER
Filed Aug. 5, 1920
3 sheets-sheet 3
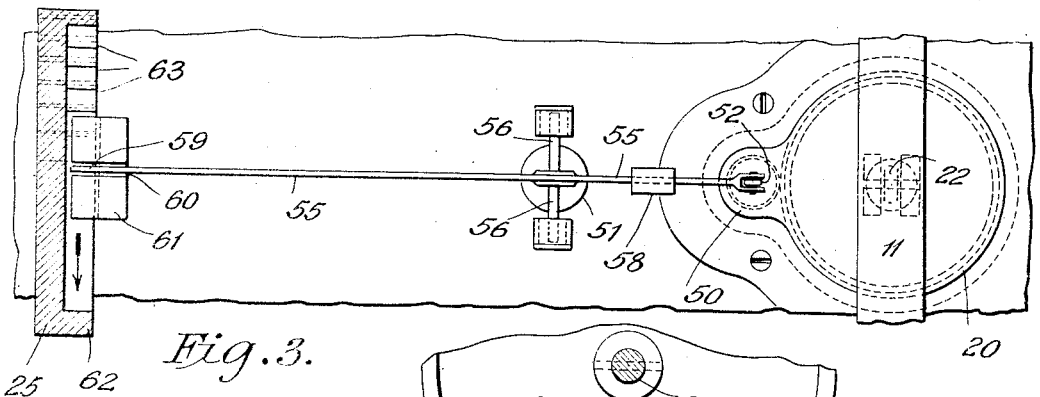
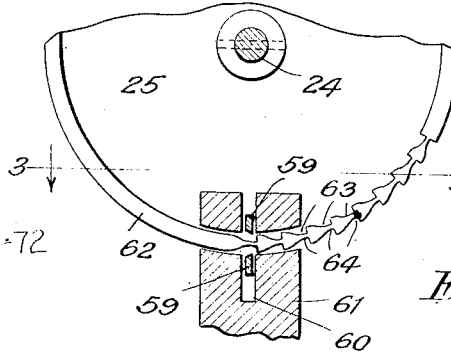
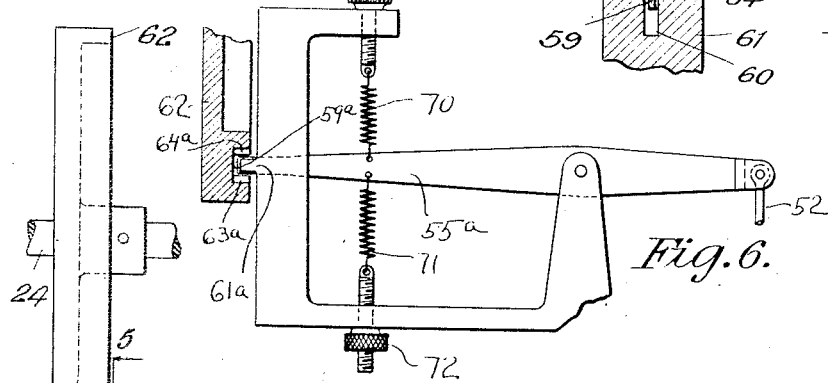
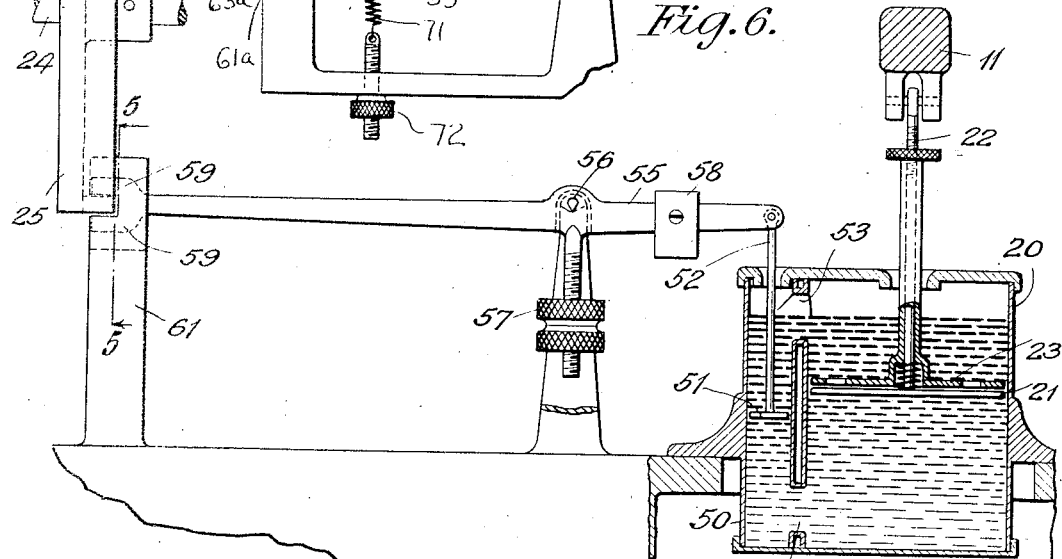

Patented Mar. 20, 1923.

1,449,162

UNITED STATES PATENT OFFICE.

FREDERICK G. L. BOYER, OF DAYTON, OHIO, ASSIGNOR TO THE COMPUTING SCALE COMPANY, OF DAYTON, OHIO, A CORPORATION OF OHIO.

SCALE AND AUXILIARY CONTROLLER.

Continuation of application Serial No. 25,091, filed April 30, 1915. This application filed August 5, 1920. Serial No. 401,389.

*To all whom it may concern:*

Be it known that I, FREDERICK G. L. BOYER, a citizen of the United States, residing at Dayton, in the county of Montgomery, State of Ohio, have invented certain new and useful Improvements in Scales and Auxiliary Controllers, of which the following is a full, clear, and exact description.

This invention relates to certain new and useful improvements in scales and more particularly relates to means for preventing premature operations of a mechanism which is controlled by the scale until the scale itself has attained a position of equilibrium.

The invention has for one of its objects the provision of a mechanism of such character that it will properly function without in any way retarding the swinging movement of the scale parts as they approach a condition of equilibrium. The mechanism further provides for preventing premature operations, irrespective of the direction of movement of the scale parts and also irrespective of reversals of the direction of movement of said parts. Other objects reside in the provision of a mechanism of such character as to function properly in combination with a scale moved part which attains innumerable variable positions of displacement in load equilibrium. Other objects and advantages will be pointed out in more details in the accompanying specification and more particularly defined in the appended claims.

The mechanism for preventing premature operations has a particular utility in a combined variable displacement scale and recording or computing mechanism. Such mechanism may be manually or power actuated by a source of power independent of the native power of the scale and such mechanism includes usually an element which is power moved to occupy a position corresponding with the extent of movement of a scale moved part, and preferably is controlled in its movement by said part. In structures of this sort means are also provided for locking the scale moved part as soon as the computing operation is started. This combination, in connection with a computing multiplying means or mechanism, I do not claim in the present application as it forms part of the subject matter of a patent issued to myself and Edith E. Boyer, No. 1,338,282. Certain specific details of this combination are, however, claimed in the present application.

Fig. 3 is a top plan view of certain parts of the premature operation preventing devices, certain parts are shown in section, the section being taken on line 3—3 of Fig. 5. Fig. 4 is a rear elevation with certain parts in section of the parts shown in Fig. 3. This view is also an enlarged detail view of certain parts shown in Fig. 2.

Fig. 5 is a detail view of certain of the locking devices shown in Fig. 4. This view is in part sectional, the section being taken on line 5—5 of Fig. 4.

Fig. 6 illustrates a modified construction of the devices shown in Fig. 4.

Figures 1, 7, 8:
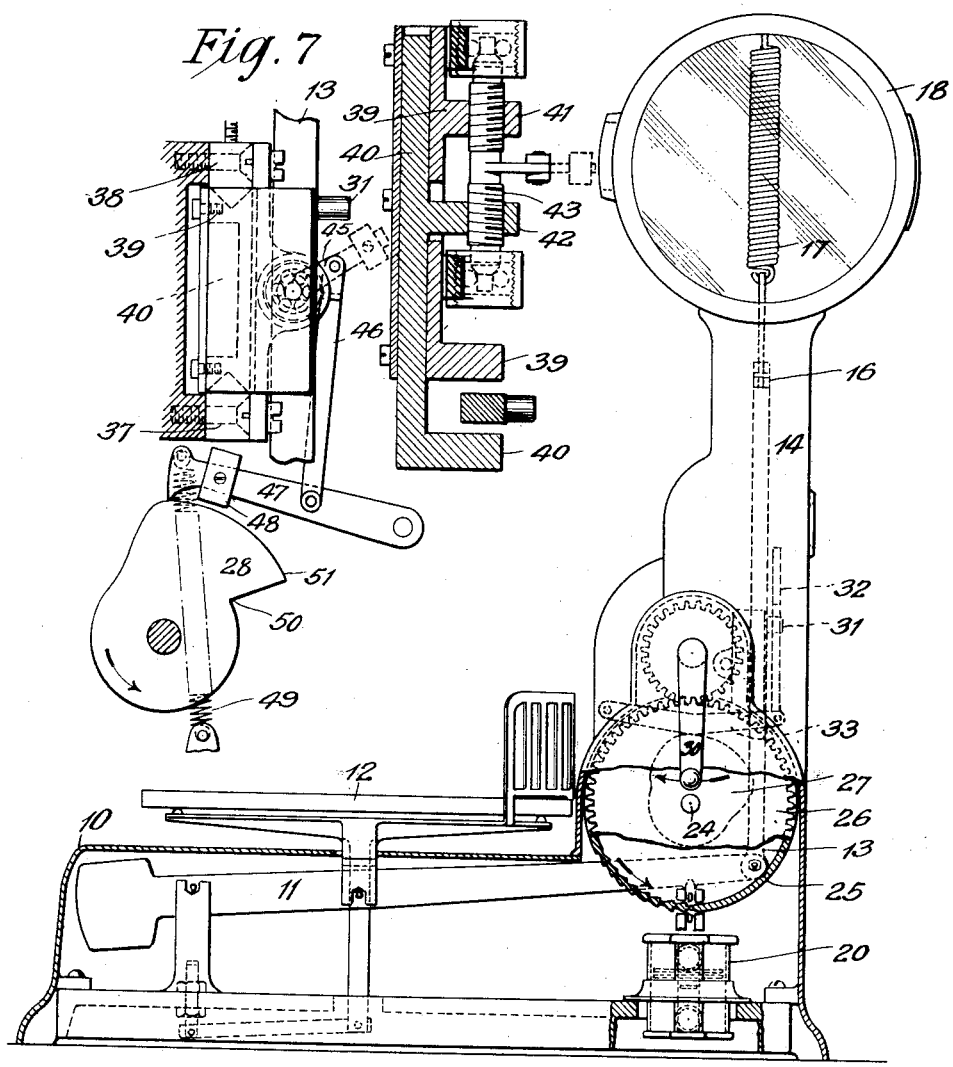
Fig. 1 shows a side elevation of a scale embodying my invention.

Figs. 7 and 8 are detail views of the mechanism used to lock the scale after the computing operation is started.

In more detail 10 is a housing containing the usual scale lever 11 here shown or a lever of the second order. A platform 12 is supported upon knife edges on the lever and is maintained horizontal by the usual check. The rear end of the lever connects with a draft rod 13 which extends upwardly in a pedestal 14 and connects with an equalizing bar carrying drum actuating racks 15. Another transverse bar 16, is connected with the lower end of springs 17 which are supported by the drum housing 18. The drum is of the usual construction and is provided with the usual chart 20, showing the weight through windows in the front and back of the drum housing. These parts are similar to well known constructions now employed on commercial scales and need not be described further in detail.

It may be here stated that the lever 11 has a variable displacement in accordance with varying weights on the platform, and in accordance with varying degrees of stretch in the springs 17. In other words the lever assumes a varying position of loaded equilibrium. In the embodiment herein shown the lever 11 assumes innumerable and infinite positions of equilibrium.

In order to dampen the movement of the scale parts and to bring them more quickly to rest after a weighing operation there is provided the usual dash pot device comprising a cylinder 20 (hereinafter termed a primary cylinder) a primary piston 21 therein connected with a rod 22 to the lever 11. As shown in Fig. 4 the primary piston 21 is provided with a valve plate or disc 23 which is adjustable to vary the action of the dash pot. As this construction is old in the art it will not be further explained.

*Controlled mechanism.*

Figure 2:
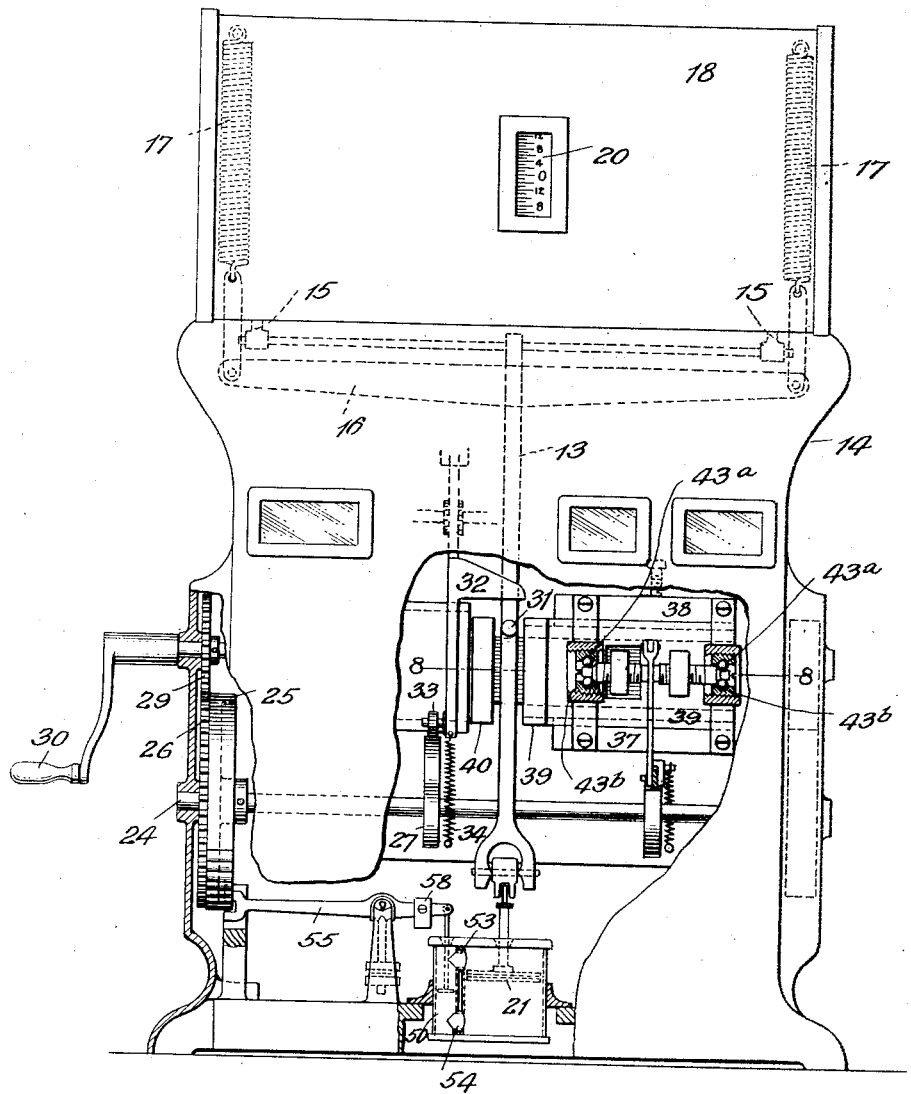
Fig. 2 is a rear elevation of the scale. A part of the casing is broken away to show the interior construction including parts of the interior mechanism and the scale controlled element.

Referring to Fig. 2 there is shown journalled in bearings in the pedestal a shaft 24 having pinned thereto an annular drum 25 which has secured to it a gear 26. The shaft also has rigidly mounted thereon cams 27 and 28. Meshing with gear 26 is a gear 29 which is fastened to a stub shaft journalled in the pedestal of the scale and having fastened to its outer end an operating handle 30.

As shown in Fig. 2 and in dotted lines in Fig. 1 the draft rod 13 carries a pin 31 which forms a stop for an L-shaped piece 32. This piece at its lower end has a pin which extends on to a pivoted cam follower 33 resting upon and cooperating with cam 27. A spring 34 draws part 32 and cam follower downward into contact with the cam 27. When cam 27 is turned by handle 30 the spring 34 will draw part 32 downward until it is arrested by the pin 31 on draft rod 13. The part 32 constitutes a controlling element for the controlled mechanism whereby the supplementary mechanism is controlled in accordance with the displacement of the draft rod and scale lever. This mechanism is not here shown in detail. It is sufficient to state that this mechanism may effect numerous results. It may control recording, indicating, computing or other desired mechanism. Part 32 constitutes a scale controlled element and also is a controlling element for other mechanism. It will be understood that the complete operation (two revolutions) of the handle 30 restores part 32 to normal position.

In order to lock the draft rod 13 before the controlling element comes into contact therewith a locking mechanism is provided which is adapted to firmly clamp the draft rod in the position which it has assumed. If this mechanism were not provided the tension of spring 34 or the weight of the parts would move the draft rod to a position not in accordance with the weight on the scale, whereby an incorrect weight would be displayed and the controlling element 32 would also be set to an incorrect position which would not be in accordance with the weight on the scale. This locking mechanism will now be described; see particularly Figs. 2, 7 and 8. Guides 37 and 38 slidably support an L-shaped block 39 which is in turn grooved to slidably support an L-shaped block 40. These blocks 39 and 40 have portions adjacent the flat sides of the draft rod (see Fig. 8). The blocks are both slidable relatively to each other and have projecting lugs 41 and 42 which extend rearwardly (lug 42 passing through an aperture in block 39) to receive a threaded shaft 43. This shaft has right and left hand screw threads whereby upon its being partially rotated the blocks 39 and 40 will be brought towards one another to clamp the draft rod therebetween. I have thought it preferable to align the screw shaft with the clamping jaws to obviate any tendency to tilt the jaws when clamping action occurs.

This same alignment of the screw shaft and center of pressure also causes the blocks, which have slight play therebetween, to align themselves so that the entire jaw surfaces engage the scale set part uniformly over the entire surface of contact.

In order to provide for end thrusts on the screw shaft and for transverse adjustment of the clamping parts, I mount the screw threaded shaft in ball bearings 43$^a$ and provide a screw threaded adjustment 43$^b$ for the cones as shown in Fig. 2. In order to oscillate or partially rotate the screw threaded shaft 43 for clamping or unclamping the draft rod, the shaft is provided with a bell crank arm 45. A link 46 connects crank arm 45 with a pivoted cam follower 47. The follower is held against the cam 28 by coil spring 49 (see Figs. 2 and 7). The cam follower 47 is provided with a sharp end which rests upon the edge of cam 28. This cam is provided with a deep sharp notch 50 which allows the cam follower to snap quickly down to lower position and effect a quick locking. I have found that usually the spring action alone will not attain a tight clamping action. However, the application of a weight 48 to the cam follower or to arm 45 provides sufficient inertia thereto to effect a tight clinching of the clamping parts against the draft rod. The rise of the cam is more gradual to provide a gradual unclamping action. In Fig 7 the cam 28 is shown with a considerable dwell 51, which must pass from under the cam follower before it can snap into the notch. The purpose of this dwell is to allow a range of handle movement for the action of the premature operation devices to act before the locking action on the draft rod occurs. These devices will be hereafter described. The locking devices just described are, however, timed to come into action before initial downward and following movement of controlling element 32 so that the draft rod will be firmly clamped before the controlling element comes into contact therewith.

*Premature operation preventing devices.*

With a combined scale and computing or recording machine, it is desirable, in fact practically essential, to prevent the taking of a computation or record until the scale parts have come to a position of rest or load equilibrium as I will hereafter term it. Otherwise the parts might be locked or the record or computation made with the scale parts in motion or at a position of rest at the end of an oscillation prior to coming to rest. In either of these instances incorrect results would be computed. A scale also is a very delicate instrument and mechanical interlocks, or other structures, which interfere with the scale movement must be avoided if correct weighings are desired. A scale also has a very weak inherent motive power which function must be considered.

The counterweight 57 constitutes a yielding counterbalancing means for the lever 55. This weight normally maintains the lever in mid position but yields to permit the lever to be rocked clockwise or counterclockwise.

With the present invention I provide alongside of the dash pot or the primary cylinder 20 a secondary cylinder 50 in which there is a piston 51 and piston rod 52. The secondary cylinder is connected to the dash pot or primary cylinder by ports or passages 53, 54. Passage 53 connects the cylinder above the pistons and passages 54 below them. Whenever primary piston 21 is in motion in either direction a flow or surge of a medium such as a liquid or gas, if an air dash pot is employed, will be set up around through a circuit comprising primary cylinder 20, passage 53, secondary cylinder 50 and passage 54. The direction of this flow or tendency to flow will depend on the direction of movement of piston 21. In certain instances this action may be considered as an unbalancing of fluid pressures in the lower and upper halves of the system. In either instance the unbalanced forces will tend to and will move the secondary piston relatively to cylinder 50. This piston movement is employed to prevent premature operations. The action of the piston in no material degree affects the accuracy of the weighing or causes a frictional drag as it does in no way effect a greater retarding action upon the dash pot 20 usually employed upon scales of this type.

The upper end of piston rod 52 connects with a locking lever 55 which lever is preferably supported on knife edge bearings 56, (see Fig. 3). The lever is also preferably provided with a depending adjustable counterweight 57 disposed below the pivots and a sliding weight 58. By adjusting these weights the action may be adjusted. Weight 57 has particular utility in that its up and down adjustment affects the sensitiveness of action of lever 55. The lever 55 is forked at its left hand end and these forked parts 59 pass through a slot 60 in a notched upright standard 61. The inner edges of the forks 59 are sharp and when in equilibrium assume such a position that the annular rim 62 of the drum 25 can pass therebetween. A portion of the edge or rim 62 is notched with diametrically opposite series of notches 63 and 64, (see Fig. 5). If the secondary piston has moved from normal position by reason of the movement of the primary piston the lever 55 will be rocked either clockwise or anti-clockwise, bringing the sharp edges of the forks into the notches 63 or 64. Then if movement of the handle be attempted the lever 55 will constitute a lock for the drum 25, and prevent the operation. However, as soon as the primary piston comes to rest the lever 55 will return to normal position under the influence of counterweight 57. The handle can then be operated and the operation effected. The reason for providing a plurality of notches is to prevent the manipulation of the handle to release the mechanism at the end of the piston movement, i. e., at the extreme end of an oscillation of the scale lever but before it has assumed its final mid-position of rest at load equilibrium position. Under such conditions it might be possible to release the handle by careful manipulation.

By providing a plurality of locking notches such fraudulent operations are prevented since the second notch will effect the locking, or possibly the third, if the first does not. The purpose of the notched standard and the slot receiving the forks 59 is to assume the strain that comes upon the lever 55 should the handle be turned when a fork 59 was in one of the notches. It will be understood, as previously explained, that the timing of the parts is such that the locking of the draft rod and the movement of the controlling element do not occur until immediately after the notches 63, 64 have passed the forks 59 and until the smooth part of rim 62 has come between the forks 59. The forks 59 also form a pair of stops cooperating with the annular rim 62 to limit the extreme movement of the lever 55.

Fig. 6 shows a modified construction in which rim 62 is grooved and internally notched at $63^a$ and $64^a$. The end $59^a$ projects between these notches and the standard $61^a$ supports and backs up the lever $55^a$ and end $59^a$ as before. The lever $55^a$ is maintained in central position of equilibrium by springs 70 and 71. These springs are carried by the standard $61^a$ and their tension may be adjusted by means of the knurled nuts 72.

Hereafter in certain of the claims I will term the scale element a first element, the locking lever 55 a second element and the to be controlled part or parts such as drum 25, a third element.

It will be understood that my invention is not limited to the precise details of construction shown and described. What I claim as my invention is more particularly pointed out in the appended claims.

The present application is a continuation of my copending application Serial No. 25091, filed April 30, 1915, and allowed November 8, 1920.

What I claim is:—

1. In combination, a weighing scale having an element having varying displacement in accordance with varying loads thereon, a mechanism operable in accordance with the displacement of said element, means set into operation by the scale element for preventing the operation of the said mechanism when the scale element is in motion, and means for varying the sensitivity of said last mentioned means.

2. In combination, a weighing scale having an element therein which has a varying displacement in accordance with varying loads thereon, a manually actuated mechanism, means controlled by the scale element for preventing the operation of said mechanism until the said element attains any one of a plurality of points of equilibrium.

3. In a computing scale, in combination, a weighing scale comprising a scale part which assumes variable positions of equilibrium in accordance with varying loads on the scale, a mechanism having a controlling element operable in acordance with the extent of movement of the scale part and means controlled by the scale element for preventing the actuation of said mechanism until the scale part attains a position of equilibrium.

4. In a device of the class described comprising in combination, a weighing scale and a mechanism having a part actuated in accordance with the displacement thereof, means controlled by the scale element for preventing the operation of said mechanism when the scale is not in position of equilibrium, said means being operable to effect said preventing of operation without restricting the free to and fro motion of the scale.

5. In combination, a weighing scale and a mechanism operable by a source of power independent of the scale, said scale including a part having a variable displacement in accordance with varying loads thereon and assuming any one of substantially an infinite number of positions of equilibrium, means controlled in its action by said part for preventing the operation of said mechanism until the scale part has come to rest in any one of the said positions of equilibrium.

6. The invention set forth in claim 5 in which means governed by a movement of a scale part are provided for controlling said preventing means, said means operating without imposing an additional load upon the scale and without restricting the free to and fro movement of the scale parts.

7. The invention set forth in claim 5 in which means is provided for varying the sensitiveness of the said preventing means.

8. In a device of the class described, in combination, a scale part having a variable displacement in accordance with variable loads thereon, a dash pot connected therewith, a mechanism operable by a source of power independent of the scale and controlled by said scale and means associated with the aforesaid dash pot for preventing an effective actuation of said mechanism until the scale part assumes a position of equilibrium.

9. In a device of the class described, a weighing scale, comprising a scale lever, a part movable in unison therewith, a pair of clamping jaws between which said part is normally free to move, a screw shaft for actuating said jaws to clamp the part therebetween, and means for rotating said screw shaft, said means including an inertia weight adapted to tightly clinch the jaws against the part after contact therewith.

10. In a device of the class described, a weighing scale, in combination with mechanism actuated independently therewith and controlled in extent of movement thereby, a scale part, means for clamping the said part, said means including clamping jaws slidable relatively to each other and to their support, and means for actuating the said jaws to clasp the part therebetween.

11. A clamping device for a movable scale positioned part comprising a pair of clamping elements, a screw shaft for clamping said parts together and an adjustment for said shaft for shifting the shaft longitudinally and for shifting the clamping elements laterally relative to the scale moved part.

12. A clamping device for a movable scale positioned part comprising a pair of L-shaped blocks, one of said blocks being mounted to slide relatively to the other and the other block mounted to slide relatively to its support, a lug on each of said blocks and a screw shaft cooperating with said lugs and disposed in alignment with the clamping points on said blocks for clamping the same against the scale moved part.

13. In combination, a weighing scale having a scale lever therein, a dash pot operatively connected therewith, a supplementary cylinder connected with said dash pot, a piston therein, a mechanism adapted to be controlled in its extent of movement by the extent of movement of the scale, means for actuating the same, and means coupled with the piston in the supplementary cylinder for preventing the actuation of the last mentioned means until the scale has attained a position of equilibrium.

14. In combination, a primary cylinder and piston, a secondary cylinder and piston, said cylinder having a port connecting the same, fluid in the cylinders and port, and means for holding the secondary piston in a given position, said means comprising an element adapted to yield and allow the piston to move in response to movement of the fluid induced by movement of the primary piston and return it to said given position when movement of the primary piston ceases.

15. In combination, a primary cylinder and piston, a secondary cylinder and piston, said cylinder having a port connecting the cylinders, fluid in the same and port, a pivotally mounted lever attached to the secondary piston so it will rock when the piston moves, means for holding the lever in its normal position, said means being adapted to yield and allow the lever and piston to move in response to movement of the fluid induced by movement of the primary piston and return them to said normal position when movement of the primary piston ceases, and a member which is locked by the lever against movement when the lever is in any other than its normal position.

16. In combination, a primary cylinder and piston, a secondary cylinder and piston, said cylinder having a port connecting the same, fluid in the cylinder and port, a pivotally mounted lever attached to the secondary piston so it will rock when the piston moves, springs for holding the lever in normal position but adapted to yield and allow the lever and piston to move in response to movement of the fluid induced by movement of the primary piston and return them to said normal position when movement of the primary piston ceases, stops for limiting the movement of the lever, and a member which is locked by the lever against movement when the lever is in any other than normal position.

17. In combination, a fluid dash pot adapted for connection to a movable mechanism for the purpose of retarding its movement, a cylinder connected to the dash pot by a port, a piston in said cylinder, means for maintaining said piston in its normal position, said means comprising an element adapted to yield and permit the piston to move from said normal position in response to movement of the fluid induced by movement of said mechanism, and return it to its normal position when movement of said mechanism ceases, a movable member associated with said mechanism, and means for preventing movement of said member while the piston is in other than normal position.

18. In combination, a primary cylinder and piston, a secondary cylinder and piston, said cylinder having a port connecting the same, fluid in the cylinders and port, a pivotally mounted lever attached to the secondary piston so it will rock when the piston moves, means for holding the lever in its normal position, said means being adapted to yield and allow the lever and piston to move in response to movement of the fluid induced by movement of the primary piston and return them to said normal position when movement of the primary piston ceases, a member which is locked by the lever against movement when the lever is in any other than its normal position, and means for stopping said member should the lever be moved from its normal position while said member is in motion.

19. A device of the class described, comprising an element mounted for to and fro movement and adapted to come to rest in any one of a plurality of positions, a second element, means for operating the same, and means controlled by said first element for preventing operation of said second element unless said first element is in any one of its plurality of positions of rest.

20. A device of the class described, comprising an element having a to and fro movement and adapted to come to a final position of rest in an infinite number of positions, a second element and means comprising in part a fluid which is set in motion by movement of the first element for preventing the operation of said second element until the first element, and the fluid set in motion thereby has come to a position of rest.

21. In a device of the class described, in combination, a first element mounted for to and fro movement and adapted to occupy any one of a plurality of positions, a second element, means for operating said second element when said first element is at rest in any one of its various positions, and means controlled by said first element for preventing operation of said second element, while said first element is in any degree of motion.

22. A device of the class described, comprising, in combination, a movable element adapted to come to rest in an infinite number of positions, a second element, a member cooperating with the second element, means controlled by the movement of the first element irrespective of its direction, position or degree of motion for controlling the operation of said member to prevent the operation of the second element until the first element has assumed any one of its infinite positions of rest.

23. A device of the class described having, in combination, a movable first element, a second element having provisions associated therewith for moving the same, a third element cooperating with the second element to prevent or permit the movement of the same, means comprising in part a fluid for controlling the movement of the third element, and means cooperating with the first element to set the fluid in motion and prevent the operation of the second element during motion of the first element, said last-named means acting to stop the motion of the fluid when the first element is at rest and thereby permit the movement of the second element.

24. A device of the class described, comprising an element having a to and fro movement and adapted to come to a final position of rest in various positions, a second element, and means cooperating with both elements and, in operation, mechanically dissociated from and permitting such freedom of movement of the first element as to unimpair its final position of rest, for preventing operation of the said second element until the to and fro motion of the first has ceased and it has come to rest.

25. A device of the class described comprising in combination an element mounted for to and fro movement adapted to come to a final position of rest, a second element, means for operating the same, means controlled by said first element for preventing operation of said second element until the first element has come to rest, said last named means having provisions for operating to prevent the movement of said second element without mechanically impairing the freedom of motion of the first element should the operation of the second element be attempted while the first element is in motion.

26. A device of the class described comprising a movable first element adapted to come to a final position of rest in various positions, a second element, means for operating said second element when said first element is at rest in any one of its various positions, means controlled by said first element for preventing operation of said second element while said first element is in any degree of motion, said means and second element including provisions for stopping the operation of said second element should the movement of the first element begin while the second element is being operated.

27. In combination, a weighing scale, a mechanism operable by a source of power independent of the scale and controlled by said scale, a movable scale part, means including a medium in which surges may be set up, means comprising an element connected to said movable scale part for setting up surges in said medium upon movement of said movable part, and means controlled by the surges produced by said last named means for preventing the operation of said mechanism until the scale has come to rest.

In testimony whereof I hereto affix my signature.

FREDERICK G. L. BOYER.